United States Patent [19]

Sawashima et al.

[11] Patent Number: 5,946,699
[45] Date of Patent: Aug. 31, 1999

[54] VERSION MANAGEMENT APPARATUS AND METHOD FOR DATA HAVING LINK STRUCTURE

[75] Inventors: Nobuyuki Sawashima, Tokyo; Takashi Suzuoka, Kawasaki; Tetsuya Yamane, Tokyo, all of Japan

[73] Assignee: Kabushiki Kaisha Toshiba, Kawasaki, Japan

[21] Appl. No.: 08/905,816

[22] Filed: Aug. 4, 1997

[30] Foreign Application Priority Data

Aug. 5, 1996 [JP] Japan .................................... 8-206145

[51] Int. Cl.⁶ .................................................. G06F 17/30
[52] U.S. Cl. ........................... 707/203; 707/501; 707/513; 395/200.47; 395/200.48; 345/356
[58] Field of Search ..................................... 707/203, 200, 707/201, 202, 204, 8, 501, 513, 10; 345/356, 357; 395/200.48, 200.47

[56] References Cited

U.S. PATENT DOCUMENTS

| | | | |
|---|---|---|---|
| 5,047,918 | 9/1991 | Schwartz et al. | 707/203 |
| 5,671,428 | 9/1997 | Muranaga et al. | 345/329 |
| 5,721,919 | 2/1998 | Morel et al. | 707/203 |
| 5,809,317 | 9/1998 | Kogan et al. | 707/501 |

*Primary Examiner*—Thomas G. Black
*Assistant Examiner*—Hosain T. Alam
*Attorney, Agent, or Firm*—Oblon, Spivak McClelland, Maier & Neustadt, P.C.

[57] ABSTRACT

A version management apparatus for managing the versions of data having link structure obtained by designating an address, has a data obtaining section for obtaining data having link structure of the designated address, a section for extracting addresses buried in the obtained data having link structure, a section for storing the extracted addresses, a section for selecting an address from the address storage section, and instructing the data obtaining section to obtain data designated by the selected address, and a section for storing data obtained by the data obtaining section or its modified data by adding the address of the data and version data associated with the version of the data thereto.

9 Claims, 7 Drawing Sheets

START OF DESIGNATION
 CONDITION :
  START ADDRESS :
   ADDRESS A1
   ADDRESS A2
    ⋮
   ADDRESS Ak

SCHEDULED TIME FOR
  OBTAINING DATA :
   ADDRESS RANGE B1 TIME B1
   ADDRESS RANGE B2 TIME B2
    ⋮    ⋮
   ADDRESS RANGE B$\ell$ TIME B$\ell$ TIME INTERVAL FOR
  OBTAINING DATA :
   ADDRESS RANGE C1 TIME INTERVAL C1
   ADDRESS RANGE C2 TIME INTERVAL C2
    ⋮    ⋮
   ADDRESS RANGE Cm TIME INTERVAL Cm ADDRESS RANGE FOR
  OBTAINING DATA :
   ADDRESS RANGE D1
   ADDRESS RANGE D2
    ⋮
   ADDRESS RANGE Dn

END OF DESIGNATION
 CONDITION :

FIG. 3

VERSION MANAGEMENT APPARATUS AND METHOD FOR DATA HAVING LINK STRUCTURE

BACKGROUND OF THE INVENTION

1. Field of the Invention

The present invention relates to a version management apparatus and method, which manage the versions of data having link structure that can be obtained by designating addresses.

2. Discussion of the Background

In general, since data are updated or deleted after they are created, version management for storing data of the previous version and searching it later or comparing it with data of a new version has been necessary. In a conventional version management tool, individual data to be managed must be designated in advance.

When the number of data is large, such data are distributed via a network, or a plurality of persons add, delete, and update data, it becomes hard to recognize the states of the individual data. Consequently, it becomes hard to designate the individual data to be managed, thus disabling version management. In particular, in version management of data having link structure, only a version management tool that manages data having link structure in the same manner as normal data is available, and no tool can manage versions by utilizing the features of the data having link structure.

On the other hand, in order to search only required data from a large number of data, it is effective to perform search for all the data. For large-scale data having link structure, for example, a search service for hypermedia data on WWW (World Wide Web) on the Internet is already available. However, such search service concerns only data of relatively new unique version, and no search service that also concerns previous versions is available.

In this manner, even when version management of data having link structure is done, individual data must be designated, and version management is often difficult when the number of data is large.

Also, upon search of data having link structure, data of the previous version cannot be searched.

BRIEF SUMMARY OF THE INVENTION

It is an object of the present invention to provide a version management apparatus and method, which need not designate all data having link structures to be subjected to version management, and can obtain data by minimum required designation to manage versions of data.

In order to achieve the above object, according to the first aspect of the present invention, a version management apparatus for managing versions of data having link structure that can be obtained by designating an address, comprises data obtaining means for obtaining data having link structure of the designated address, address extracting means for extracting addresses buried as designation data in the data having link structure obtained by the data obtaining means, address storage means for storing at least the addresses extracted by the address extracting means, address selecting means for selecting an address from the address storage means, and instructing the data obtaining means to obtain data designated by the selected address, and data storage means for storing an address of the data and version data associated with a version of the data in correspondence with the data obtained by the data obtaining means.

According to the second aspect of the present invention, a version management method for managing versions of data having link structure that can be obtained by designating an address, comprises the steps of: obtaining data having link structure of the designated address; extracting addresses buried as designation data in the obtained data having link structure, storing the extracted addresses, and storing an address of the data and version data associated with a version of the data in correspondence with the obtained data; and selecting an address that satisfies a predetermined selection condition, from the stored addresses, and instructing to obtain data designated by the selected address.

According to the third aspect of the present invention, a computer readable storage medium stores a program for controlling a computer to obtain data having link structure of a selected address, to extract addresses buried as designation data in the obtained data having link structure, to store the extracted addresses, to store the address of the data and version data associated with a version of the data in correspondence with the obtained data, to select an address that satisfies a predetermined selection condition from the stored addresses, and to instruct to obtain data designated by the selected address.

In the present invention, version data may include at least one of the data obtained time, data stored time, data size, and version No. indicating the number of times of storage for data at an identical address.

Further, in the present invention, the designation condition includes, e.g., the start address as an address from which data begins to be obtained, the scheduled time for obtaining data designated by the address or the time interval for obtaining, the address range for obtaining data, and the like.

When an address is selected on the basis of the scheduled time for obtaining data designated by an address, for example, the current time is referred to, and an address that has reached the scheduled time is selected. On the other hand, when an address is selected on the basis of the time interval for obtaining data designated by an address, for example, the previous obtained time is checked using the address additional data added to the address, and is compared with the current time, thereby selecting the corresponding address. If an address does not fall within the address range for obtaining address data, such address is not selected even if it is stored in the address storage means.

Further, in the present invention, when the data storage means stores data having the same address as that of the already stored data, it may modify old data in a format that can be restored based on other stored data or store it intact, and may additionally store new data.

Further, in the present invention, when the data storage means stores data having the same address as that of the already stored data, it may store the difference between old data (immediately preceding version) and new data in place of storing the new data.

Further, in the present invention, when the data storage means stores data having the same address as that of the already stored data, it may replace and re-store old data (immediately preceding version) by the difference from new data, and may additionally store the new data.

Further, in the present invention, the search service means may perform search for data within the time range designated by the user.

According to the present invention, since hypermedia data indicated by addresses buried as designation data (or anchors) in the obtained data having link structure (e.g., hypermedia data) are extracted and are designated as the linked objects to be obtained, hypermedia data can be obtained in turn by designating some addresses without designating all the addresses of hypermedia data to be subjected to version management. In addition, hypermedia data can be repetitively obtained at predetermined timings, and version management of the hypermedia data obtained at the individual timings can be attained.

According to the present invention, since data having link structure indicated by addresses buried as designation data in the obtained data having link structure are extracted and are designated as the linked objects to be obtained, data having link structure can be obtained in turn by designating some addresses without designating all the addresses of the data having link structure to be subjected to version management. In addition, data having link structure can be repetitively obtained at predetermined timings, and version management of the data having link structure obtained at the individual timings can be attained.

In this manner, various versions of data having link structure can be searched.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of the storage structure in a designation condition storage section;

DETAILED DESCRIPTION OF THE INVENTION

An embodiment of the present invention, which is applied to, e.g., the Internet, will be described hereinafter with reference to the accompanying drawings.

Expressions used in this embodiment will be explained.

The phrase "data having link structure" means data in which no address or at least one address indicating another data or its own data is buried in the data itself. The buried address will be referred to as "designation data" hereinafter. As such data having link structure, for example, hypermedia data are known.

Note that data having link structure with designation data "0" is the one which is looked up from other data but is located at the end of the link.

In this embodiment, an "address" means identification data added to a unique document for distinguishing each sentence.

In general, data changes over time since it is created, updated, and deleted. Note that the states of data at given time instances will be referred to as versions hereinafter. Various operations associated with versions, e.g., operations for storing some versions of certain data, obtaining a designated old version, or restoring an old version (when data of a new version has been destroyed, the data may be restored by obtaining its old version) will be referred to as "version management" hereinafter.

Figure 1:
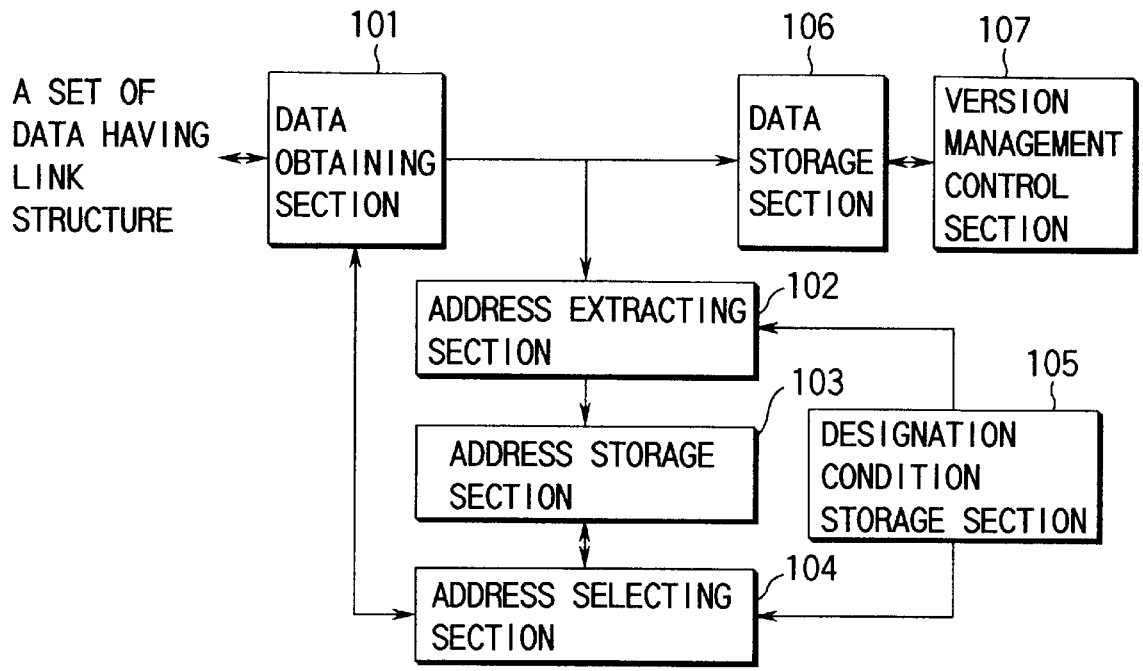
FIG. 1 is a diagram showing the basic arrangement of a version management apparatus according to an embodiment of the present invention.

FIG. 1 shows the basic arrangement of a version management apparatus according to an embodiment of the present invention.

The version management apparatus of this embodiment comprises a data obtaining section 101, an address extracting section 102, an address storage section 103, an address selecting section 104, a designation condition storage section 105, a data storage section 106, and a version management control section 107.

The data obtaining section 101 obtains data corresponding to the designated address from a set of data having link structure, which are distributed on the network. The data obtaining section 101 further includes a function of making the obtained data to be correspondent with the version data relating to the version of the data and storing them in the data storage section 106.

The address extracting section 102 extracts addresses buried as designation data from the data obtained by the data obtaining section 101, selects an address that satisfies a designation condition stored in the designation condition storage section 105 from the extracted addresses, and stores the selected address in the address storage section 103.

The address storage section 103 stores an address and address additional data. The address additional data includes data associated with the address such as a flag indicating whether or not data is obtained, obtained time and date of data, and the like.

The address selecting section 104 selects an address from which the next data is to be obtained from those stored in the address storage section 103. The address is selected based on the designation condition if the designation condition storage section 105 stores the designation condition. On the other hand, if there is no designation condition, an address from which no data is obtained yet, an address with the oldest obtained time of data, or the like is preferentially selected.

The designation condition storage section 105 stores a designation condition including the time interval for obtaining data at a given address, the address range for obtaining data, and the like.

The data storage section 106 stores version data. The version data includes data obtained by the data obtaining section 101, modified data of that data (modification includes compression of data, partial extraction of data, difference data, enlargement, reduction, and deformation of picture data, translation of text data, and modulation of speech data, and the like), an address for uniquely pointing to the data, and the obtained time of the data. In this embodiment, each version is updated in correspondence with the number of obtained times of data. That is, when a certain address is accessed to obtain data for the first time, for example, version 1 is defined. When the identical address is accessed to obtain data for the second time, version 2 is defined. In this way, when the identical address is accessed for the n-th time, version n is defined.

The version management control section 107 obtains data of the designated version using data stored in the data storage unit 106. In this case, the version management control section 107 takes control associated with version management. For example, as will be described later, when a difference or a compression technique is used, the section 107 calculates a difference by comparing data of two versions, or restores data of the designated version. Note that the control in the version management control section 107 is basically the same the conventional version management technique (SCCS or RCS in UNIX), and a detailed description thereof will be omitted.

In this embodiment, processing is done in the following procedure.

First, a start address is stored in the address storage section 103. The start address serves as a start point when data are obtained in turn by following data having link structure on the basis of designation data. In the conventional version management apparatus, all the addresses must be designated. However, in this embodiment, the start address alone need be designated. Note that as the start address, one address may be designated, or a plurality of addresses may be designated.

Subsequently, the address selecting section 104 selects one of addresses stored in the address storage section 103. Upon selection, the section 104 looks up the designation condition stored in the designation condition storage section 105. For example, an address from which no data has been obtained yet or an address with the old obtained time may be preferentially selected.

The data obtaining section 101 obtains data having link structure designated by the address selected by the address selecting section 104.

The address extracting section 102 extracts a plurality of addresses buried as designation data from the data obtained by the data obtaining section 101, selects the address to be stored from the extracted addresses with reference to the designation condition stored in the designation condition storage section 105, and stores the selected address in the address storage section 103.

On the other hand, the obtained data is stored in the data storage section 106 intact or after it is modified, together with version data such as the data obtained time, and the like. At this time, data of the previous version is left unchanged or is modified to a format that can be restored from other stored data.

Thereafter, the control returns to address selection by the address selecting section 104, and obtaining of data and the like are repeated.

With the above-mentioned procedure, according to this embodiment, data can be obtained in turn by designating some addresses without designating all the data having link structure to be managed, thus realizing version management.

Although not shown in FIG. 1, this embodiment may comprise a search service section. The search service section has a function of performing search with reference to data stored in the data storage section 106. With this function, data of various versions can be searched. For example, search of data including those of previous versions in a large-scale hypermedia system represented by WWW can be realized.

This embodiment will be described in detail below.

The following description will exemplify a version management apparatus that performs version management of data having link structure as an embodiment of the present invention, and especially, automatically obtaining of data having link structure and a search service will be mainly explained.

As described above, data having link structure is the one in which none of or one or more of an address (designation data) indicating another data is buried.

As an example of data having link structure, WWW developed on the Internet are known. In this case, a set of data having link structure are distributed to respective servers of the WWW, and the address of each data includes, e.g., data for specifying a server in the network and data for specifying data in the server.

As described above, such data change since they are updated or deleted after they are created. For this reason, it is effective to perform version management for storing previous data, and obtaining previous data later or checking changes in data.

The version management apparatus of this embodiment performs version management using data having link structure obtained by following addresses buried in data having link structure and storing the obtained data together with version data. For this reason, not all the data having link structure to be managed need be designated in advance, and data can be automatically obtained and stored by minimum required designation. Such apparatus is effective when all the data cannot be recognized.

As another feature of this embodiment, stored data of various versions can be searched using a search service apparatus. In this manner, data of a previous version that has already been deleted in, e.g., a hypermedia group can be searched.

In this embodiment, when new data is added, old data is replaced by the difference between the old data (data having a version immediately before that of new data) and the new data, and the new data is additionally stored without any modification (that is, the old data is modified). More specifically, new data is always stored as complete data, and as for old data, only the difference from the new data is stored.

In place of the above-mentioned method, various other methods such as a method of storing data of various versions without any modifications, a method of storing new data as difference data, a method of compressing and storing data, and the like may be used. Depending on applications, original data need not always be stored in a format that can be restored. For example, if the stored data is used in search alone, the data can be modified to a format convenient for search.

The storage structures in the individual storage sections in the version management apparatus will be described in detail below.

The storage structure in the address storage section 103 will be described.

Figure 2:
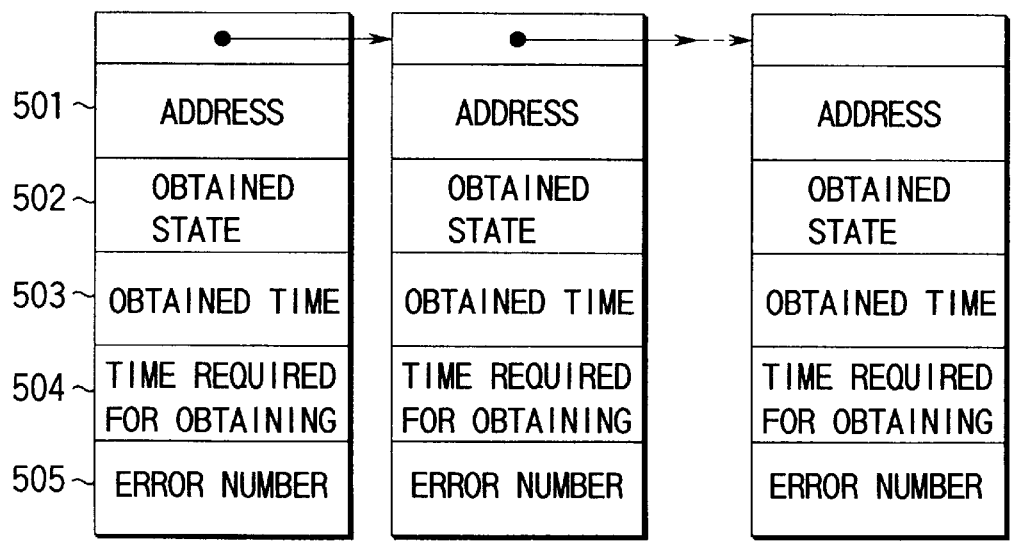
FIG. 2 shows an example of the storage structure in an address storage section.

FIG. 2 shows an example of the storage structure in the address storage section 103.

In this embodiment, as shown in FIG. 2, an address (501) and address additional data (obtained state (502), obtained time (503), time required for obtaining (504), and error number (505)) are managed as one unit in a list structure.

The address (501 in FIG. 2) is data indicating data having link structure.

The obtained state (502 in FIG. 2) is a state associated with data obtainment corresponding to the address, and one of states "not obtained yet", "successful obtainment", and "obtainment failure" is stored.

The state "not obtained yet" indicates a state wherein data corresponding to the address is not obtained yet.

The state "successful obtainment" indicates that the latest data obtainment is successful. At this time, the obtained time (503 in FIG. 2) stores the obtained time of the data, and the time required for obtaining (504 in FIG. 2) stores the time required for obtaining the data.

The state "obtainment failure" indicates a state wherein the latest data obtainment has failed. At this time, the failure reason is recorded as the error number (505 in FIG. 2). The failure reasons include (1) time-out, (2) no data corresponding to the address is present, (3) permission for obtaining data is not granted owing to reasons associated with security, and the like, and such reasons have corresponding error numbers. At this time, the obtained time (503 in FIG. 2) stores the attempt start time of obtainment, and the time required for obtaining (504 in FIG. 2) stores the time required between the attempt start time of obtainment and the failure response return time.

Note that the obtained state stores the immediately preceding state alone. However, when the address selecting section 104 or the like adjusts choices more finely, earlier states may be stored and used.

In this embodiment, the list structure is used as the storage structure in the address storage section 103. Alternatively, a hash structure may be used to improve access efficiency.

The storage structure in the designation condition storage section 105 will be described below.

The designation condition storage section 105 stores the designation condition as a text. The reason why the text is used is that the designation condition may be directly used by a person such as a manager. Note that a recording structure other than the text may be used.

FIG. 3 shows an example of the storage structure in the designation condition storage section 105.

A start address serves as a start point when data are obtained in turn by following data having link structure on the basis of designation data. Normally, there are a plurality of start addresses (of course, only one address may be used), and such addresses are stored in the address storage section 103 at the beginning of the processing.

Note that the "scheduled time for obtaining" defines the time for obtaining data designated by a given address. In addition to the time, the day of the week can be designated, and for example, a description for realizing a designation "obtain data at 3 o'clock every Wednesday" may be given. Note that the scheduled time for obtaining can define the address range.

The address range indicates the range of addresses from which data are to be obtained, and one address, a plurality of addresses separated by [,], a range directly designated using [–] like "address 1–address 2", or combinations of them may be used. In addition, logic operations using [and], [or], [not], and the like and wildcard designations using [*], [?], and the like can also be used. Upon interpretation of a formula representing the address range, a conventional syntax analysis technique may be used.

The "time interval for obtaining" designates a time interval from when data corresponding to a given address is obtained until the next data at that address is obtained. The time interval for obtaining can be designated for the address range.

The "address range for obtaining" designates a certain address range. That is, data are obtained from the ranges described here. If this column has no entry, data are obtained from all the addresses in this embodiment.

The storage structure in the data storage section 106 will be explained below.

Figure 4:
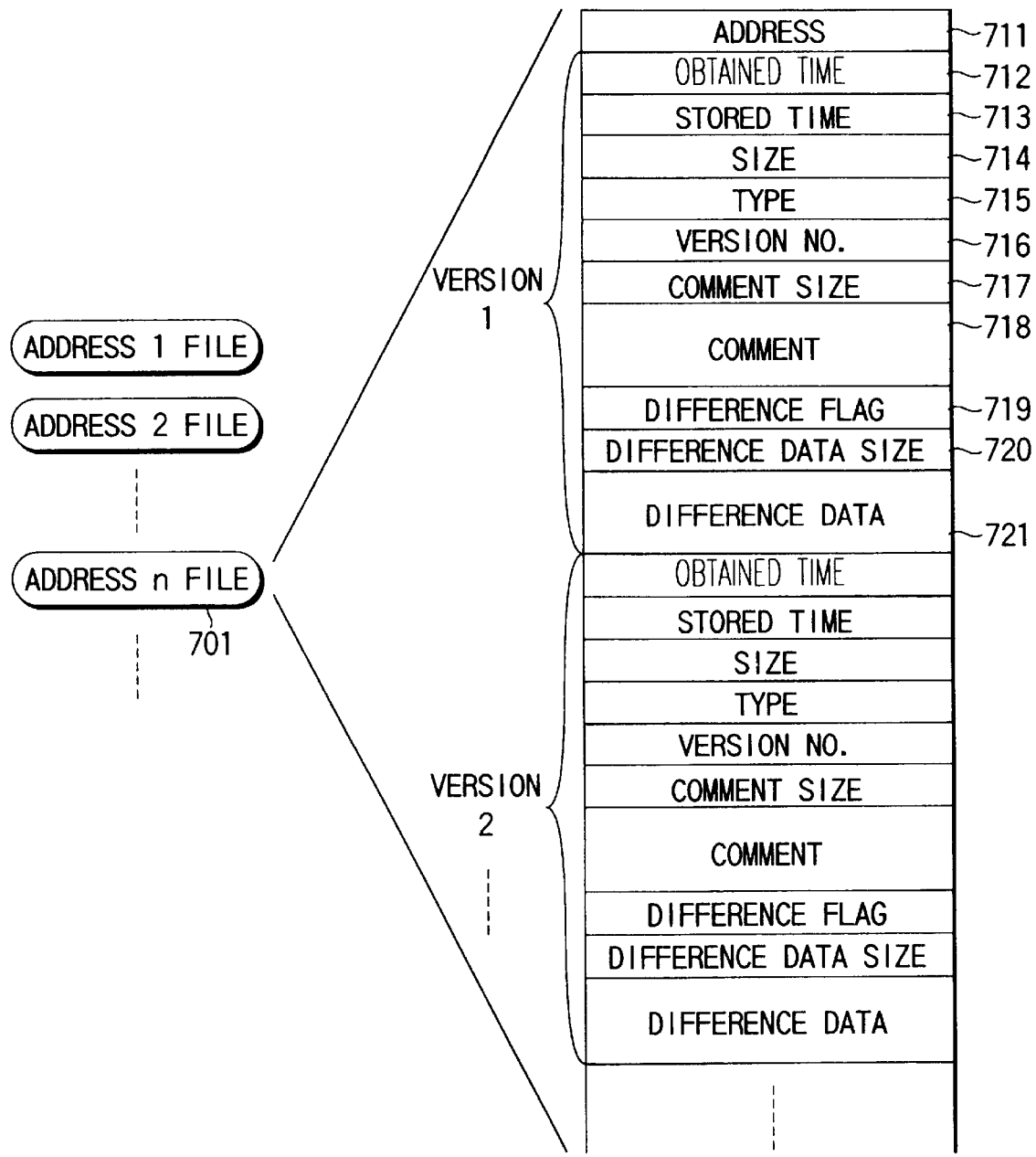
FIG. 4 shows an example of the storage structure in a data storage section.

FIG. 4 shows an example of the storage structure in the data storage section 106.

Data of the individual versions are recorded while being classified into files in units of addresses. In this embodiment, the address is identification data uniquely assigned to data. A file name uniquely corresponds to an address, i.e., it includes, for example, an address name. For example, the file name of data at address n is an address n file, as denoted by 701 in FIG. 4.

Each file stores an address (711 in FIG. 4), and data corresponding to the respective versions follow. Each version has version data (obtained time (712), stored time (713), size (714), type (715), version No. (716), comment size (717), comment (718)), and a data portion (difference flag (719), difference data size (720), difference data (721)).

The "obtained time" indicates the time at which the data of the corresponding version was obtained by the data obtaining section 101.

The "stored time" indicates the time at which the individual data of the corresponding version were stored in the data storage section 106. The stored time is normally close to the obtained time.

The "size" indicates the real size of data of the corresponding version.

The "type" indicates the type of data of the corresponding version. The type includes, e.g., a text, still image, audio, moving image, and the like. Since the type often changes depending on versions, e.g., the type "text" in the older version may change to "still image" in the newer version, types can be stored in units of versions.

The "version No." is a number uniquely assigned to the corresponding version. Unless otherwise specified, the version No. is incremented by one every time the version is revised.

The "comment size" indicates the size of a comment.

The "comment" is a comment associated with the corresponding version, and an arbitrary comment can be inserted.

The "difference flag" is a flag indicating whether or not the data of the corresponding version is stored as difference data. In this embodiment, normally, except for data of the latest version of the corresponding address, difference flags are ON (data are stored as difference data). Also, whether or not data is stored as difference data can be designated using this flag.

The "difference data size" indicates the size of difference data.

The "difference data" is a portion that stores the data main body. In this embodiment, when the difference flag is ON, difference data from the next version is stored; when the difference flag is OFF, data is stored directly. In this embodiment, data of the latest version of the corresponding address is always stored as full data.

If the data obtaining section 101 can obtain the actual updated time of data, the version data may include the updated time.

The flow of the data obtaining processing in the version management apparatus of this embodiment will be explained below.

Figure 5:
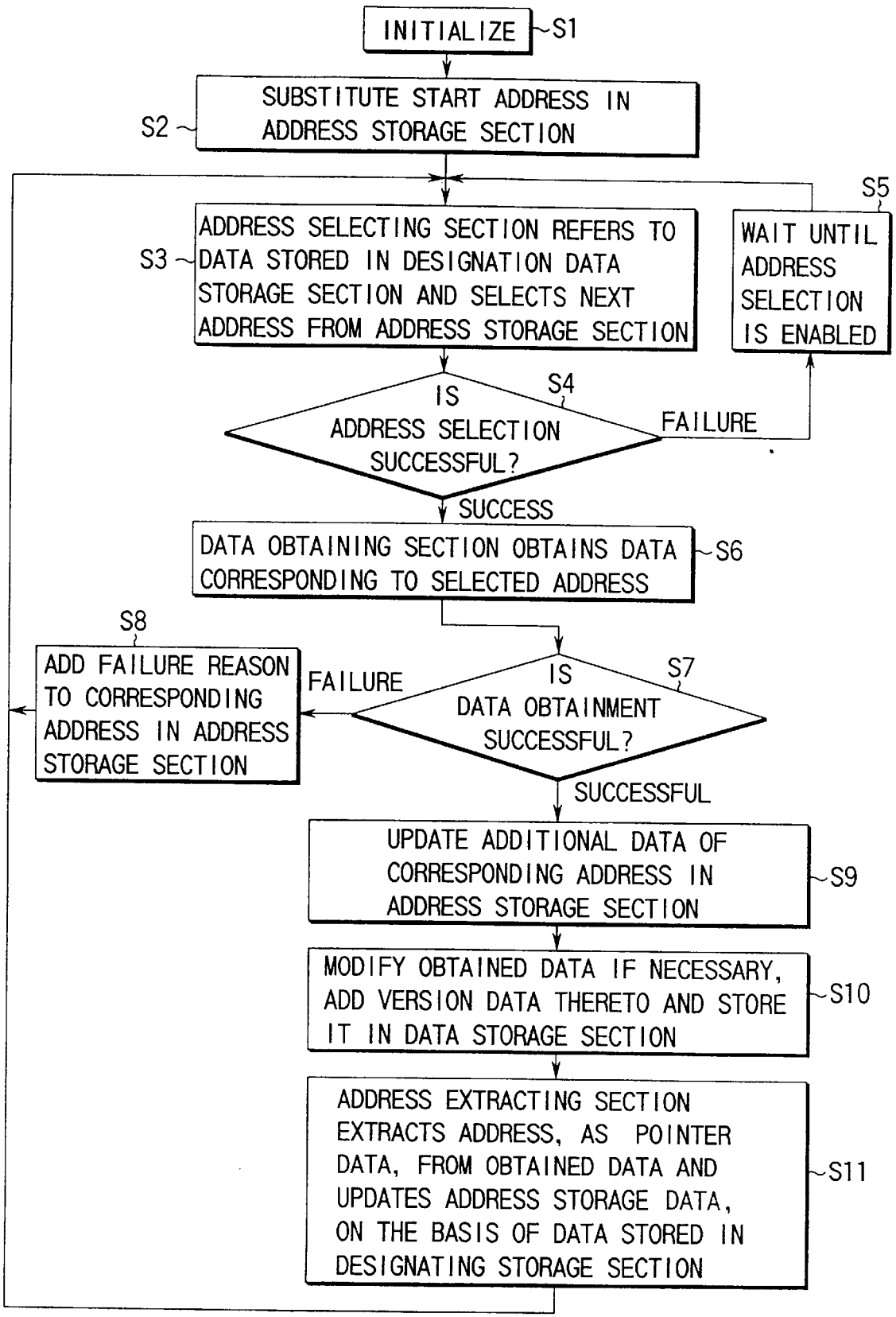
FIG. 5 is a flow chart showing the flow of processing in the embodiment shown in FIG. 1.

FIG. 5 is a flow chart showing the flow of the processing of the version management apparatus of this embodiment. Note that the programs shown in the flow charts of FIG. 5 and FIGS. 7 and 8 (to be described later) are stored in a main memory in a versatile computer system, or can be stored in, e.g., distributable storage media such as a floppy disk, hard disk, CD-ROM, and the like.

First, in step S1, the overall system is initialized. For example, stored data are cleared.

In step S2, start addresses are stored in the address storage section 103. As described above, the start address serves as a start point when data are obtained in turn by following data having link structure. Upon storing the start address, the obtained state as address additional information is set to be "not obtained yet".

The control enters loop processing from step S3.

In step S3, the address selecting section 104 selects an address of the next data to be obtained from those stored in the address storage section 103.

Upon this selection, the address selecting section 104 looks up data stored in the designation condition storage section 105. For example, even when the address storage section 103 stores address A, if the address range for obtaining stored in the designation condition storage section 105 does not include address A, address A is not selected. On the other hand, when it is designated in the designation condition storage section 105 that the time interval for obtaining data at address B is 1 hour, and the previous obtained time for address B stored in the address storage section 103 is more than 1 hour before the current time, address B is preferentially selected.

Also, for example, when both the scheduled time for obtaining and the time interval for obtaining are designated for a given address, a method of selecting the address if one of these conditions is satisfied, a method of selecting the address if both the conditions are satisfied, a method of selecting the address by applying a predetermined one of these conditions and ignoring the other, and the like may be used.

When no designation is particularly stored in the designation condition storage section 105, an address from which no data is obtained yet, an address with the oldest obtained time of data, or the like is preferentially selected.

On the other hand, when the obtained state is "obtainment failure" and obtainment was attempted relatively recently, selection of such address may be postponed.

In step S4, it is checked if address selection in step S3 is successful. If address selection fails, this means that all the addresses stored in the address storage section 103 cannot be selected with respect to the designation conditions in the designation condition storage section 105. For example, all the addresses do not reach their scheduled times for obtaining. In such case, the control waits until address selection is enabled (step S5).

If address selection in step S3 is successful, the data obtaining section 101 obtains data corresponding to the selected address in step S6.

In step S7, it is checked if data obtainment is successful.

If data obtainment fails, the address storage section 103 stores the obtained state corresponding to the address as "obtainment failure" to use this state as one condition for address selection later, and the failure reason is written as an error number (step S8). The flow then returns to step S3.

On the other hand, if it is determined in step S7 that data obtainment is successful, the flow advances to step S9.

In step S9, the address storage section 103 updates address additional data of the corresponding address. More specifically, the section 103 stores the obtained state as "successful obtainment", and also stores the data obtained time, time required for obtaining data, and the like.

Subsequently, in step S10, the data obtained in step S6 is stored in the data storage section 106 together with version data. Note that in this embodiment, data of the previous version is replaced by a difference from data of the latest version, and the data of the latest version is directly stored. The calculation of difference data can be accomplished using a conventional technique (e.g., a diff command in UNIX). If no difference from data of the previous version is available, i.e., if data remains the same, version data such as the obtained time, and the like are stored, but the version No. is left unchanged.

Finally, in step S11, addresses buried as designation data in the data obtained in step S6 are extracted, and an address that satisfies the designation condition stored in the designation condition storage section 105 is selected from the extracted addresses. The selected address is then stored in the address storage section 103. For example, when the designation condition storage section 105 stores the address range for obtaining, only addresses included in that range are selected from the extracted addresses, and are stored in the address storage section. If no designation condition is especially stored in the designation condition storage section 105, all the extracted addresses are stored. Upon storage, the obtained state of the corresponding address is set to be "not obtained yet". On the other hand, when the address storage section 103 has already stored an identical address, that address is not updated.

Thereafter, the flow returns to step S3 to repeat the loop processing.

The procedure for obtaining data having link structure and storing the data together with version data has been described.

As described above, according to this embodiment, since data having link structure designated by addresses buried as designation data in the obtained data having link structure are extracted and designated in turn as the objects to be obtained, data having link structure can be sequentially obtained by designating some addresses without designating all the addresses of data having link structure to be subjected to version management. In addition, data having link structure can be repetitively obtained at predetermined timings, and version management for data having link structure obtained at the individual timings can be realized.

In this manner, various versions of data having link structure can be searched.

An embodiment of a search service device added to the version management apparatus shown in FIG. 1 will be described below.

In this embodiment, text data will be exemplified as the object to be searched, but the present invention is not limited to the text data. For example, other media data such as still images, audio data, and the like may be used as the objects to be searched using conventional techniques such as a pattern matching scheme.

In this embodiment, in a pre-process of search, words included in text data of each version are extracted and are stored in a database. In a search service, a word serving as a search key, version number range, updated date range, and the like may be designated, matching with the contents in the search database is done based on these designation conditions, and the matching result is presented as a search result.

Figure 6:
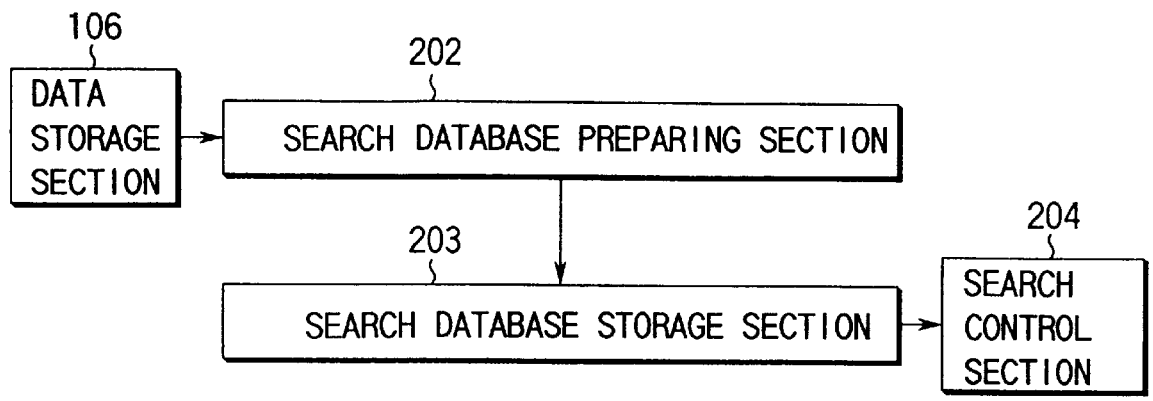
FIG. 6 is a diagram showing an example of the arrangement of a search service apparatus.

FIG. 6 shows the arrangement of the search service device according to this embodiment.

The search service device of this embodiment comprises a search database preparing section 202, a search database storage section 203, and a search control section 204.

A data storage section in FIG. 6 corresponds to the data storage section 106 shown in FIG. 1.

The search database preparing section 202 prepares a search database on the basis of data stored in the data storage section 106.

Figure 7:
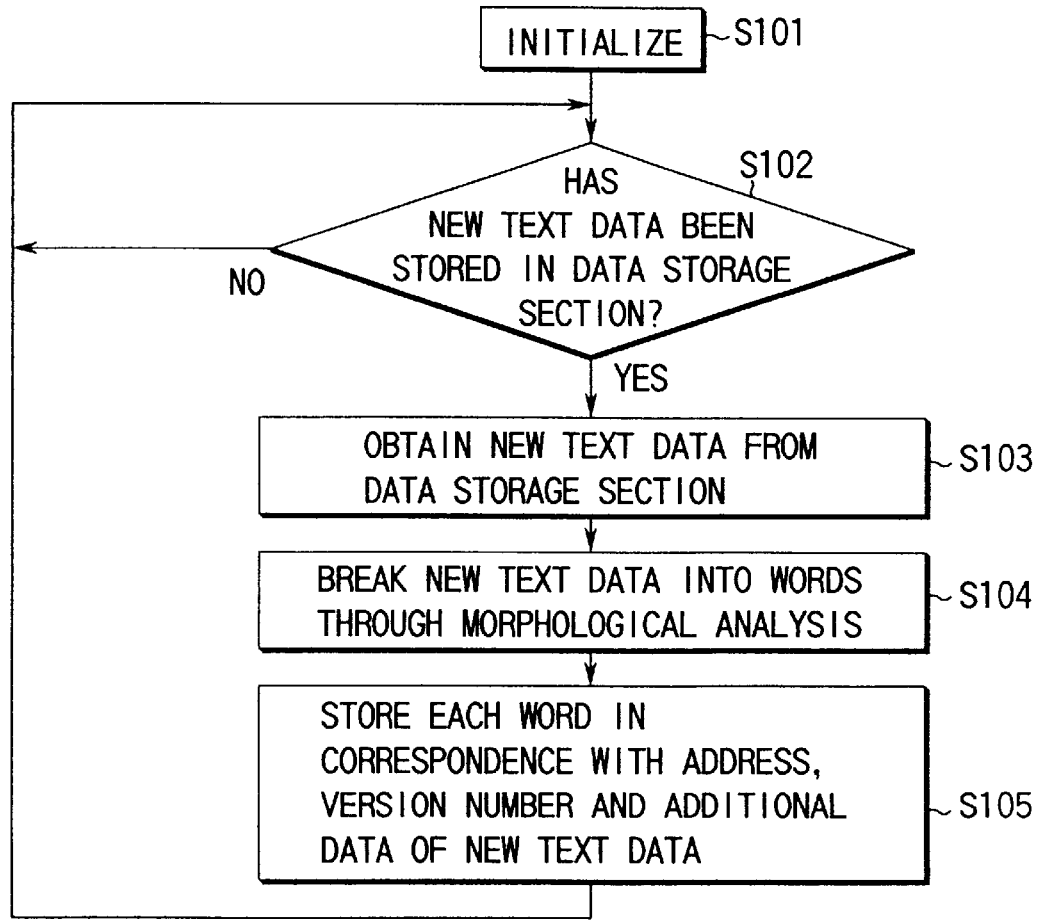
FIG. 7 is a flow chart showing the processing contents of a search database preparing section 202.

More specifically, when the search database preparing section 202 is initialized in step S101, as shown in the flow chart in FIG. 7, it checks in step S102 if new text data is stored in the data storage section 106. If YES in step S102, the section 202 obtains the new text data from the data storage section 106 in step S103. In step S104, the section 202 breaks up the new text data into words through morphological analysis. In step S105, the section 202 stores the broken-up words in the search database storage section 203 in correspondence with the address, version No., and additional data of the new text data.

The search database storage section 203 stores a search database.

The search control section 204 performs search by looking up the database stored in the search database storage section 203 on the basis of a search formula input from a search formula input section (not shown). Note that the search formula is made up of "keyword+ version No.".

Figure 8:
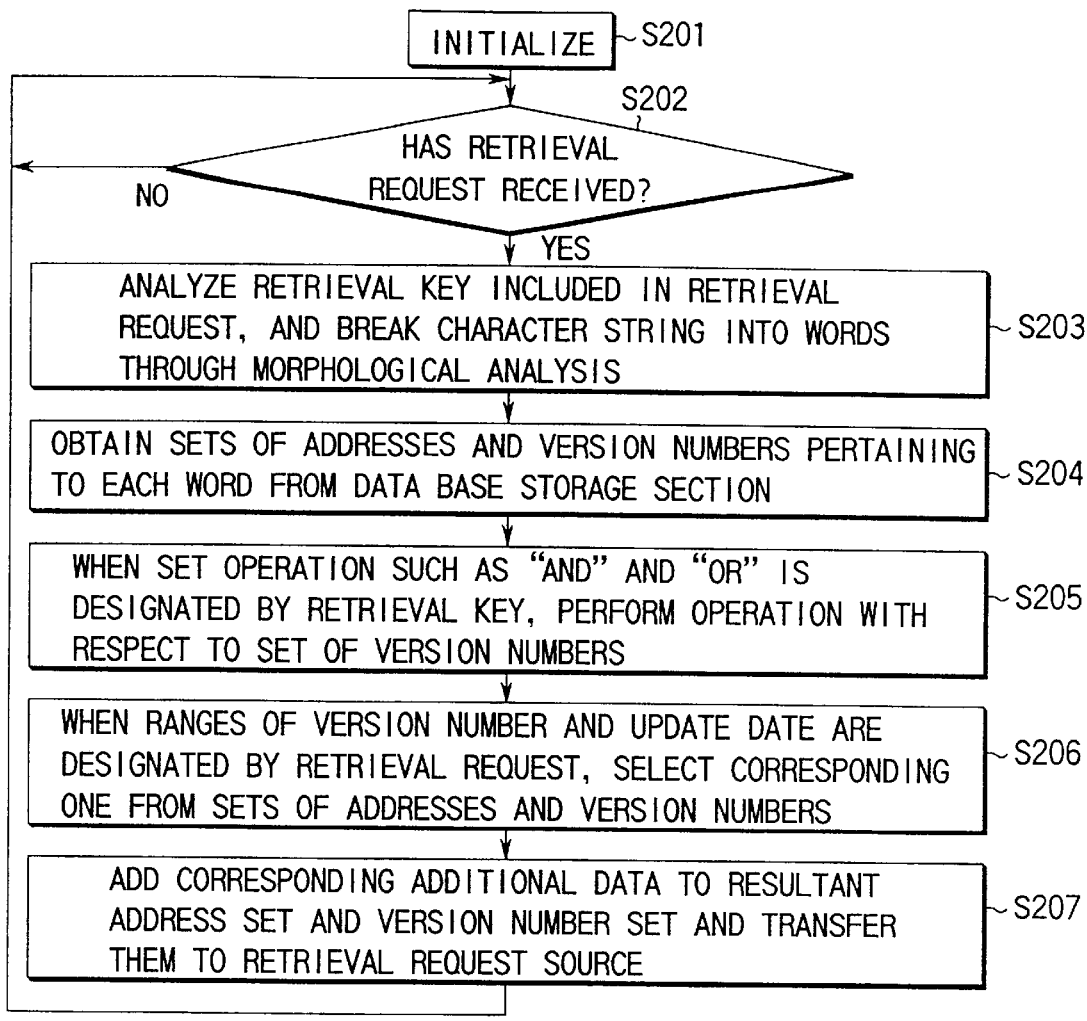
FIG. 8 is a flow chart showing the processing contents of a search control section 204.

When the search database storage section 203 is initialized in step S201, as shown in the flow chart in FIG. 8, it checks in step S202 if a search request is received. If YES in step S202, the section 203 analyzes a search key included in the search request, and breaks up a character string into words through morphological analysis in step S203. In step S204, the section 203 obtains sets of addresses and version Nos. associated with the broken-up words from the search database storage section. Subsequently, when a set operation such as AND, OR, and the like is designated in the search key, the section 203 performs an operation for the sets of addresses and version Nos., in step S205. When the version No. range and updated date range are designated in the search request, the section 203 selects the corresponding ones from the sets of addresses and version Nos. in step S206. Finally, in step S207, the section 203 adds corresponding additional data to the sets of addresses and version Nos. obtained as the search results, and transfers them to the search request source.

The storage structure in the search database storage section 203 will be explained below.

Figure 9:
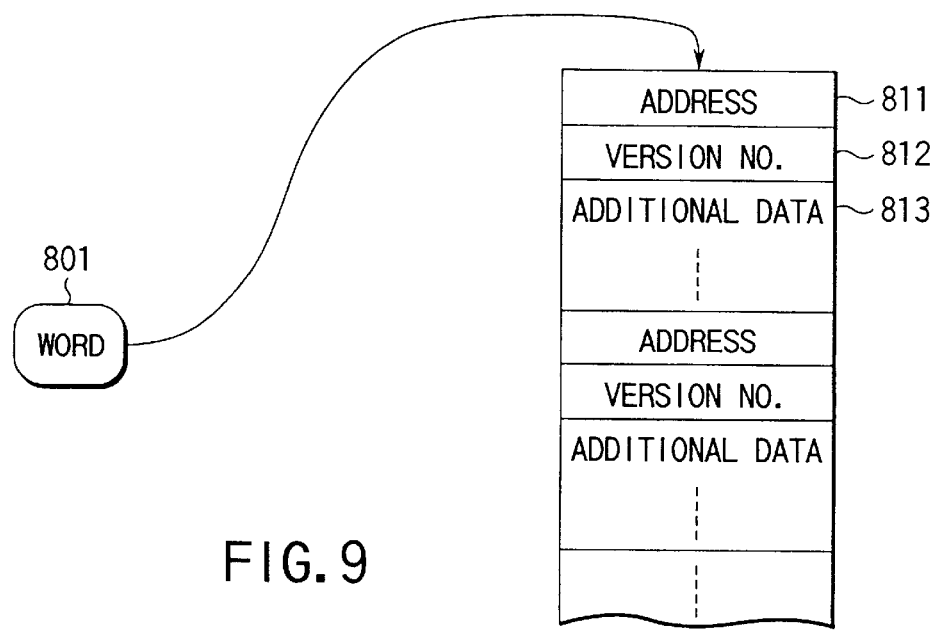
FIG. 9 shows an example of the storage structure in a search database storage section.

FIG. 9 shows an example of the storage structure in the search database storage section 203.

The search database of this embodiment has a hash structure that finds a sequence associated with the address and version of data including that word using a word as a key.

In FIG. 9, a sequence including an address (811), version No. (812), and additional data (813) as elements is looked up using a word (801) as a key.

The address is an address of the data including that word.

The "version No." is a number indicating the version of the corresponding address, and corresponds to version No. 716 in FIG. 4.

The "additional data" provides additional data to be added to the address and version No. as the minimum required search results, and includes, e.g., the updated time, the comment for the version, and the like. When the additional data includes the updated time, if the actual updated time is unknown, the above-mentioned obtained time or stored time may be used instead.

The flow of the processing in the search service device of this embodiment will be described below.

In the search service device of this embodiment, two major processing operations are performed. One processing prepares the search database, and the other processing performs actual search.

As described these are processed by the search data base preparing section 202 and the search control section 204.

An example of a version management apparatus having the arrangements shown in FIGS. 1 and 6, and its application will be described below.

Figure 10:
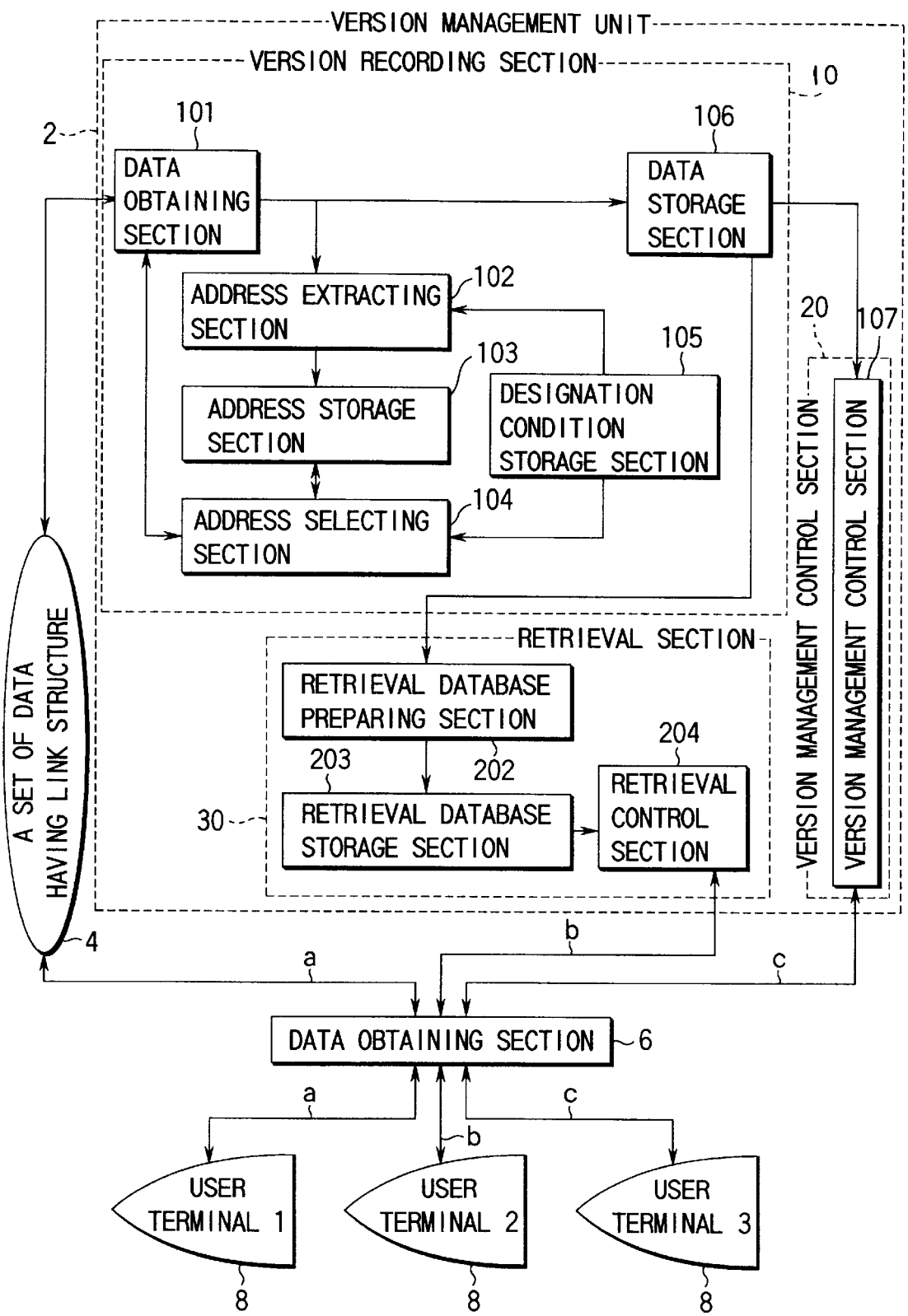
FIG. 10 is a diagram showing an example of a version management apparatus according to the embodiment shown in FIG. 1.

FIG. 10 shows the arrangement of a version management unit 2 which comprises the arrangements of both FIGS. 1 and 6.

The version management unit 2 comprises a version recording section 10, a version management control section 20, and a search section 30.

The version recording section 10 has the data obtaining section 101, address extracting section 102, address storage section 103, address selecting section 104, designation condition storage section 105, and data storage section 106 shown in FIG. 1.

The version recording section 10 obtains data from a set of data having link structure (4 in FIG. 10) in the above-mentioned procedure, and stores the obtained data in the data storage section 106 together with version data.

Note that the set of data having link structure are those with addresses. For example, WWW (World Wide Web) on the Internet are known. The data having link structure are distributed via the network.

The version management control section 20 has the version management control section 107 shown in FIG. 1.

The version management control section 20 manages the versions of data by extracting data of the previous version based on the user's request and comparing data of different versions in the above-mentioned procedure.

The search section 30 has the search database preparing section 202, the search database storage section 203, and the search control section 204 shown in FIG. 6.

The search section 30 prepares a database based on version data stored in the data storage section 106, and performs search in response to the user's request in the above-mentioned procedure.

The user normally designates an address of data having link structure to be obtained from a user terminal 8 to a data obtaining section 6, and can obtain the data from the set of data having link structure (a in FIG. 10). This is a conventional obtaining method, and since data having link structure change over time, only the data of the latest version can be obtained.

In this embodiment, since data of various versions having link structure are stored, data of the previous version can be extracted or searched.

In this embodiment, assume that the search section 30 itself has addresses similar to those of data having link structure (the search section 30 is used as a server device). The user adds a search key and the version to be searched to the address of the search section 30 using the user terminal 8, and designates them in the data obtaining section 6. Then, the search section 30 performs search, and the user can get the search results.

In this embodiment, also, the version management control section 20 itself has addresses similar to those of data having link structure (the version management control section 20 is used as a server device). The user adds the version to be obtained to the address of the version management control section 20, and designates them in the data obtaining section 6, thus obtaining the data of the designated version (c in FIG. 10). In this manner, the user can access data of the previous version in the same manner as in accesses to the current data having link structure.

As a method of designating the version, in addition to a method of clearly designating the version No., a method of designating a date or date range is available. In the latter method, the version management unit provides data corresponding to the designated date or the date range. When the date is designated, not only data having the same updated time (or, obtained time or stored time) as the designated date, but also (1) data having the latest obtained time or stored time before the designated date, (2) data having the oldest obtained time or stored time after the designated date, or (3) both data in (1) and (2) may be provided.

The present invention is not limited to the above-mentioned embodiments, and various modifications may be made within its technical scope. For example, in the above embodiments, the present invention is mainly applied to the version management apparatus and method for data on the Intranet, but may be applied to a version management apparatus and method for data on the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A version management method for managing versions of data having link structure that can be obtained by designating an address, comprising:

obtaining data having link structure of the designated address over links of two or more;

extracting addresses as designation data in the obtained data having link structure;

storing at least the extracted addresses;

selecting a specific address from the stored addresses to obtain data designated by the selected address.

2. The method according to claim 1, wherein the storing step stores address additional information associated with obtainment of data designated by the address in correspondence with the address; and the selecting step selects the address from the stored addresses by looking up the address additional data.

3. The method according to claim 1, further comprising the step of searching the corresponding data in accordance with a search formula input by a user.

4. The method according to claim 1, further comprising the step of extracting data of a designated version from the corresponding data in accordance with a request from a user.

5. The method according to claim 1, further comprising the step of storing a designation condition which can be designated in units of addresses and is associated with one of target of data obtainment and a scheduled time for obtaining data; and wherein the address selecting step selects the address from the stored addresses on the basis of the stored designation condition.

6. The method according to claim 5, wherein, of the extracted addresses, only addresses selected in accordance with the stored designation condition are stored by the address storing step.

7. A version management apparatus for managing versions of data having link structure that can be obtained by designating an address, comprising:

data obtaining means for obtaining data having link structure of the designated address;

address extracting means for extracting addresses and designation data in the data having link structure obtained by said obtaining means;

address storage means for storing at least the addresses extracted by said address extracting means;

designation condition storage means for storing a designation condition which can be designated in unites of addresses and is associated with one of target of data obtainment and a scheduled time for obtaining data;

address selecting means for selecting a specific address from said address storage means on the basis of the designation condition stored in said designation condition storage means, and instructing said data obtaining means to obtain data designated by the selected address; and means for making an address of the data and version data associated with a version of the data to be correspondent with the data obtained by said data obtaining means.

8. The apparatus according to claim 7, wherein, of the addresses extracted by said address extracting means, only addresses selected in accordance with the designation condition stored in said designation condition storage means are stored in said address storage means.

9. An article of manufacture comprising a computer usable medium having computer readable program code means embodied therein for causing versions of data having link structure that can be obtained by designating an address to be managed, the computer readable program code means in said article of manufacture comprising:

computer readable program code means for causing a computer to obtain data having link structure of the designated address over links of two or more;

computer readable program code means for causing a computer to extract addresses as designation data in the obtained data having link structure;

computer readable program code means for causing a computer to store at least the extracted addresses; and computer readable program code means for causing a computer to select a specific address from the stored addresses to obtain data designated by the selected address.

* * * * *